(12) United States Patent
Pison

(10) Patent No.: US 10,028,138 B2
(45) Date of Patent: Jul. 17, 2018

(54) METHOD FOR ATTACHMENT AND AUTHENTICATION OF A USER TERMINAL WITH A VISITED NETWORK

(75) Inventor: Laurent Pison, Jouars-Ponchartrain (FR)

(73) Assignee: CASSIDIAN SAS, Elancourt (FR)

( * ) Notice: Subject to any disclaimer, the term of this patent is extended or adjusted under 35 U.S.C. 154(b) by 833 days.

(21) Appl. No.: 13/120,807

(22) PCT Filed: Sep. 29, 2010

(86) PCT No.: PCT/FR2010/052058
§ 371 (c)(1),
(2), (4) Date: Mar. 24, 2011

(87) PCT Pub. No.: WO2012/042121
PCT Pub. Date: Apr. 5, 2012

(65) Prior Publication Data
US 2012/0076082 A1    Mar. 29, 2012

(51) Int. Cl.
*H04W 12/08* (2009.01)
*H04W 12/06* (2009.01)
(Continued)

(52) U.S. Cl.
CPC .......... *H04W 12/06* (2013.01); *H04W 12/08* (2013.01); *H04W 48/16* (2013.01); *H04W 48/18* (2013.01); *H04W 88/06* (2013.01)

(58) Field of Classification Search
CPC ....... H04W 80/04; H04W 12/06; H04W 8/26; H04W 88/182; H04W 8/082; H04W 48/18; H04W 88/06; H04W 88/16; H04W 8/04; H04W 36/0011; H04W 60/00; H04W 8/02; H04W 8/12
(Continued)

(56) References Cited

U.S. PATENT DOCUMENTS

2008/0002829 A1\*  1/2008  Forsberg et al. ............. 380/247
2010/0112975 A1\*  5/2010  Sennett et al. ............. 455/404.1
(Continued)

OTHER PUBLICATIONS

NPSTC 700 MHz Broadband Network Requirement Task Force (Task Force), Technical Working Group, "700 MHz LTE Network Interoperability" National Public Safety Telecommunications Council, Aug. 19, 2009, pp. 1-33.
(Continued)

*Primary Examiner* — Asad Nawaz
*Assistant Examiner* — Najeebuddin Ansari
(74) *Attorney, Agent, or Firm* — Pillsbury Winthrop Shaw Pittman LLP

(57) ABSTRACT

A method for attachment and authentication of a user terminal of a home type radiocommunication network with a visited type radiocommunication network, the home network including home means for attachment to a packet network and the visited network including: at least one visited base station able to ensure radio transmission and reception with user terminals located in at least one visited cell attached to the visited base station; visited authentication and control means of user terminals able to authenticate the user terminals attached to the network; and at least one visited distribution gateway ensuring radio reception and transmission with the at least one visited base station.

12 Claims, 2 Drawing Sheets

(51) Int. Cl.
    *H04W 48/18*     (2009.01)
    *H04W 48/16*     (2009.01)
    *H04W 88/06*     (2009.01)

(58) Field of Classification Search
    USPC .................... 370/328, 329; 455/404.1, 404.2
    See application file for complete search history.

(56) References Cited

U.S. PATENT DOCUMENTS

| | | | |
|---|---|---|---|
| 2011/0009085 A1* | 1/2011 | Albanes et al. | 455/404.1 |
| 2012/0044949 A1* | 2/2012 | Velev et al. | 370/401 |
| 2012/0178411 A1* | 7/2012 | Li et al. | 455/404.2 |
| 2012/0239771 A1* | 9/2012 | Rasanen | 709/206 |
| 2013/0163508 A1* | 6/2013 | Yu et al. | 370/315 |

OTHER PUBLICATIONS

Sinatriyo; "Network Sharing Scenarios and Challenges", Nokia Siemens Networks, Feb. 11, 2010, pp. 1-24.

* cited by examiner

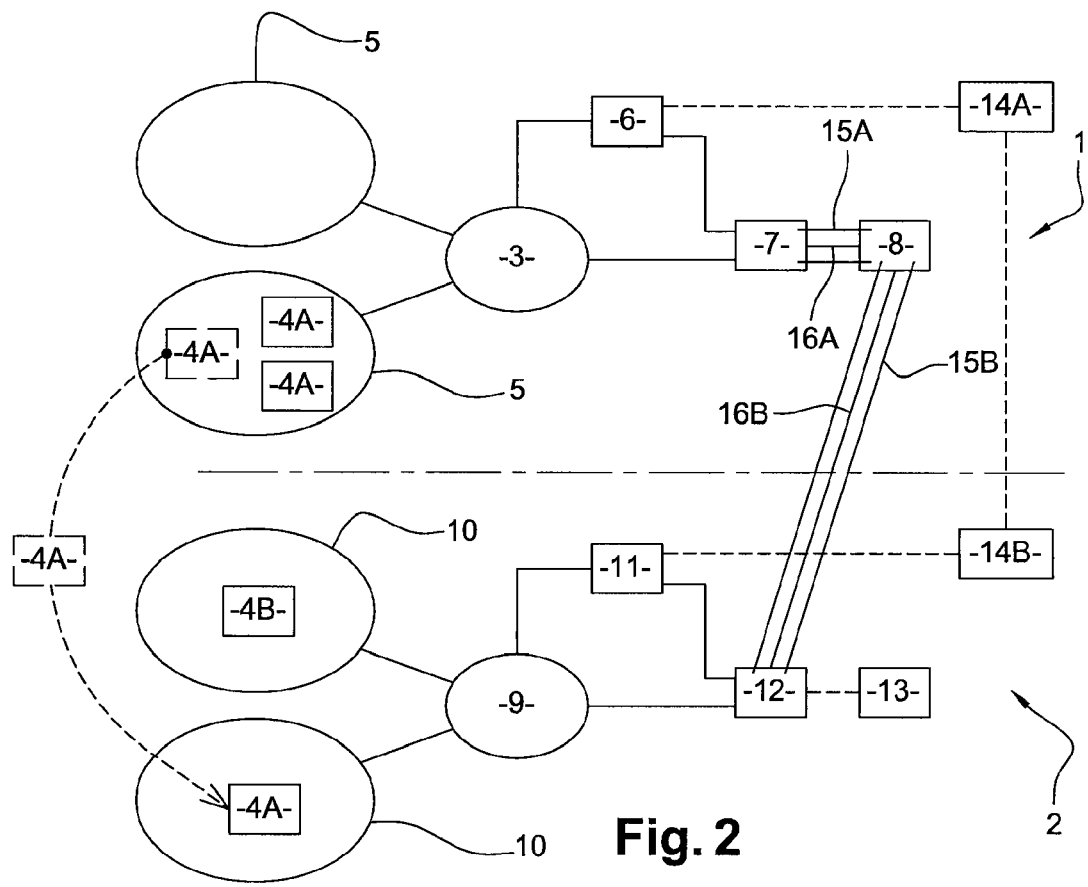
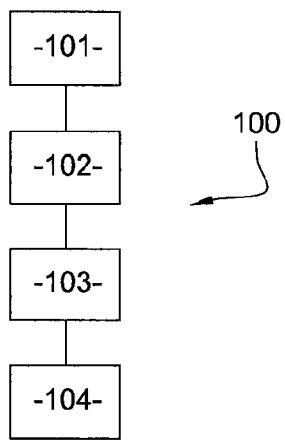
Fig. 2
Fig. 3

METHOD FOR ATTACHMENT AND AUTHENTICATION OF A USER TERMINAL WITH A VISITED NETWORK

CROSS REFERENCE TO RELATED APPLICATIONS

This application is the U.S. National Stage of PCT/FR2010/052058, filed Sep. 29, 2010, the content of which is incorporated herein by reference in its entirety.

The present invention is situated in the field of telecommunications and relates to a method for attachment and authentication of a user terminal with a visited network. More precisely, the method permits a user terminal to "roam" between a "HOME" type radio communication network and a "VISITED" type radio communication network. The invention finds a particularly interesting application in the field of "PROFESSIONAL MOBILE RADIO-COMMUNICATIONS" (PMR) applications, and more particularly in the context of using broadband telecommunication technologies.

In known manner, each user of a Public Land Mobile Network (PLMN) currently has an identification module of the SIM (Subscriber Identity Module) card type, which stores a permanent, unique user identifier (International Mobile Subscriber Identity=IMSI) comprising an internationally recognised operator identifier. This operator identifier includes a PLMN ID or an operator ID (unique MCC+MNC) that defines its HOME network uniquely. The term home network is used to refer to the network on which the user of the terminal is a subscriber.

In general, a network may extend over several geographical areas, may comprise several organisations, and even several operators.

The syntax of the PLMN ID is described in the ITU-T E-212 standard published by the International Telecommunication Union (ITU). This public network can be a second generation Global System for Mobile communications (GSM) or Global Packet Radio Service (GPRS) cellular network, a third generation network such as the Universal Mobile Telecommunications System (UMTS) or a fourth generation network of the Long Term Evolution (LTE) type, defined by the 3GPP ($3^{rd}$ Generation Partnership Project) standard.

The PLMN ID is composed as follows:
a MCC (mobile country code) formed of 3 digits corresponding to the country code;
a MNC (mobile network code) formed of 2 or 3 digits corresponding to the operator code;

In general, a network may include several geographical zones, several organisations, and even several operators.

The MCC code and the MNC code are allocated statically (see ITU-T E 212 for 3GPP type networks, ITU-T 218 for "trunk" type networks (that is to say TETRA for "Trans-European Trunked Radio), or also IEEE for WiMAX type networks.

Professional radiocommunication systems called PMR (for "Professional Mobile Radiocommunications") systems of the TETRA (Trans European Trunked Radio) or TETRAPOL type, defined by the industrial forum TETRAPOL (http://www.tetrapol.com) or else of the P25 type defined by the "Telecommunications Industry Association (TIA)" for the "Association of Public-Safety Communications Officers (APCO)", are independent mobile communication networks dedicated for the use of companies or administrations, particularly to ensure public safety or industrial safety or to intervene in transport activities. PMR networks are used widely by the public safety services (gendarmerie and national police force, for example), emergency services, and also by many other user categories (public transport, airports, and the like). These are private networks that present a high level of security. Current PMR networks, based on the technologies cited above, are known as narrowband networks and are characterized by a channel width on the order of about ten kilohertz (kHz).

The evolution of telecommunications networks and the rise of broadband encourage users of PMR systems to demand ever more sophisticated applications, which in turn require higher bandwidth. Consequently, it is important to be able to develop the PMR systems so that they are able to offer highest broadband widths, for example by implementing a broadband technology (for example of the Long Term Evolution (LTE) or Worldwide Interoperability for Microwave Access (WiMAX) types); these kinds of systems will consequently respond to an identification system defined according to the ITU-T E.212 standard.

It should be noted that each network has a PLMN ID type identifier. In other words, two neighbouring networks each have a different PLMN ID identifier. It follows that an IMSI identifier including the PLMN ID of the user's home network must be assigned to each user of a PMR network.

More particularly, to be identifiable, a PMR network user must usually have an identifier allowing him to be assigned, on the one hand, a geographical zone, such as a department for France or a county for the United States, and on the other hand, a user category such as the police or fire-fighters, or some other national or international organization.

In the case of the United States, for example, a PMR network must be divided into multiple geographical zones, each geographical zone designating one county from among more than 3000 counties forming the American territory. In addition, within each geographical area (constituted by a county for the United States) three categories of users are considered, for example: The police, the army and the fire-fighters. Consequently, in such an implementation, a minimum of 9000 identifier categories is needed, only enabling sorting per county and per user category.

A PMR network user thus has a home type identification code such as an IMSI identifier which includes the PLMN ID of the user's home network. Outside of his home network, the user is still considers as a visitor. When he is considers as a visitor, he can be either refused or accepted by the visited network. He is accepted if a roaming agreement exists between his home network and the visited network. If a roaming agreement does exist between the networks, the user's terminal submits a request for attachment with the visited network identified by a different PLMN ID identifier than that of the home network for the user's terminal.

However, such a solution poses a number of difficulties. In fact, the large number of PMR terminals combined with the plethora of roaming agreements means that a large number of PLMN ID type network identifiers are necessary.

In this context, the object of the invention is to propose a method for attachment and authentication of a user terminal transferring from a home type radiocommunication network to a visited type radiocommunication network, thus making it possible to reduce the number of required network identifiers (for example of PLMN ID type according to the ITU-T E.212 standard).

To this end, the invention relates to a method for attachment and authentication of a user terminal of a home type radiocommunication network with a visited type radiocommunication network, the home network particularly comprising home means for attachment to a packet network and the visited network comprising:
    at least one visited base station able to ensure radio transmission and reception with user terminals located in at least one visited cell attached to the visited base station;
    visited authentication and control means of user terminals able to authenticate the user terminals attached to the network; and
    at least one visited distribution gateway ensuring radio reception and transmission with the at least one visited base station;
    said method being characterized in that, the home network and the visited network each have a network identifier code that is shared by at least these two networks, in that each user terminal belonging to the home network has a first user identification code comprising, on the one hand, the network identifier code shared by at least the home network and the visited network, and on the other hand, a second home network user identification code, and in that when the user terminal belonging to the home network is located in a visited cell of the visited base station, the method comprises the following steps:
    accessing the visited network from the user terminal of the home network via the shared network identifier code;
    authenticating the user terminal in the visited network via the second user identification code of the home network with at least one database comprising information relating to the user access rights of user terminals for the visited network; and
    establishing an access channel dedicated to the user terminal of the home network between the visited distribution gateway and the home attachment means.

With this invention, a user terminal always communicates with a packet network of a radiocommunication network to which it belongs (its HOME network) even if it is attached to another radiocommunication network (VISITED network). Thus, a unique shared network identifier code of the type PLMN ID is used for several networks, and this unique PLMN ID type identification code enables a user terminal to attach to any radiocommunication network provided the first user identification code possesses exactly the same common network identification code for multiple networks as the PLMN ID type identification code of the network with which it wishes to be attached.

Besides using only a single PLMN ID for multiple networks, the method according to the invention offers the same advantages as those provided by two networks, each of which having its own PLMN ID. By way of example, the method according to the invention enables reuse of authentication in roaming mode, management of rights specific to the network visited in roaming mode, billing between networks and complete insulation and security among the various networks. In other words, the method according to the invention offers all the advantages of roaming mode that currently exist between two networks while only using a single PLMN ID value.

The method advantageously uses one access channel (for example use of the behaviour of an S8 type interface compliant with an LTE mobile radiocommunication standard and defined by technical specifications 3GPP TS 23.401 and 3GPP TS 29.274) between the distribution gateway of the VISITED network and the means for attachment to the packet network of the HOME network.

Moreover, the second home network user identification code comprises:
    an identification code for a service area of the home network;
    an identification code for a category of users of the home network; and
    a third user identification code within the service area of the home network and the home network user category. Accordingly, the home network user terminal is authenticated in the visited network on the basis of at least one of the three identification codes of the second home network user identification code,
    and in that the authentication of the user terminal of the home network in the visited network is performed using at least one of the three identification codes of the second user identification code of the home network.

The method according to the invention also may have one or more of the features below, taken individually or in any technically feasible combination:
    authentication of the home network user terminal takes place in the visited network and comprises a decoding of the second identification code of the home network user terminal in the visited base station that directs a request for attachment submitted by the user terminal to the visited network towards the visited authentication and control means that communicate with the at least one database;
    authentication of the home network user terminal is carried out by the visited authentication and control means that communicate with the at least one database;
    the database is a centralised database that communicates with the home network and the visited network;
    a home database belongs to the home network and a visited database belongs to the visited network, and the home database communicates with the visited database to authenticate the home network user terminal;
    the access channel is an S8 interface conforming to a behaviour described in an LTE mobile radiocommunication standard;
    the visited network is compliant with an LTE mobile radiocommunication standard,
        the visited attachment means being formed by a "Packet Data Network Gateway" (PDN-GW) entity,
        the visited authentication and control means being formed by a "Mobility Management Entity" (MME),
        the visited distribution gateway being formed by a "Serving Gateway" (S-GW),
        the at least one visited base station being formed by an "evolved NodeB" enodeB entity,
        the visited database being formed by a "Home Subscriber Server" (HSS);
    the method comprises a step for allocating a data channel passing through the access channel once the user terminal of the home network attached to the visited network requests communication;
    the network identifier code shared by the home network and the visited network conforms to a PLMN ID type syntax;
    the technology of the home network differs from the technology of the visited network.

The invention further relates to a radiocommunication system comprising at least one radiocommunication network of the home type and one radiocommunication network of the visited type, the home network comprising at least one user terminal and home means for attachment to a packet network, and the visited network comprising:

at least one visited base station able to ensure radio transmission and reception with user terminals located in at least one visited cell attached to the visited base station;

visited authentication and control means for user terminals that are able to authenticate user terminals attached to the network; and at least one visited distribution gateway that is able to ensure radio reception and transmission with at least one visited base station;

said system being characterized in that it is able to carry out the method according to the invention.

The invention further relates to a computer program comprising one or more sequences of instructions that are executable by an information processing unit, the execution of the instruction sequences enabling the method according to the invention to be carried out.

Other features and advantages of the method according to the invention will be evident from the following description, which is intended solely for non-limiting, illustrative purposes, and with reference to accompanying drawing, in which:

FIG. 2 shows the transfer of a user terminal from a home type radiocommunication network to a visited type radiocommunication network; and FIG. 3 shows the steps of a method for attachment and authentication of a user terminal with a visited network in accordance with the invention.

Figure 1:
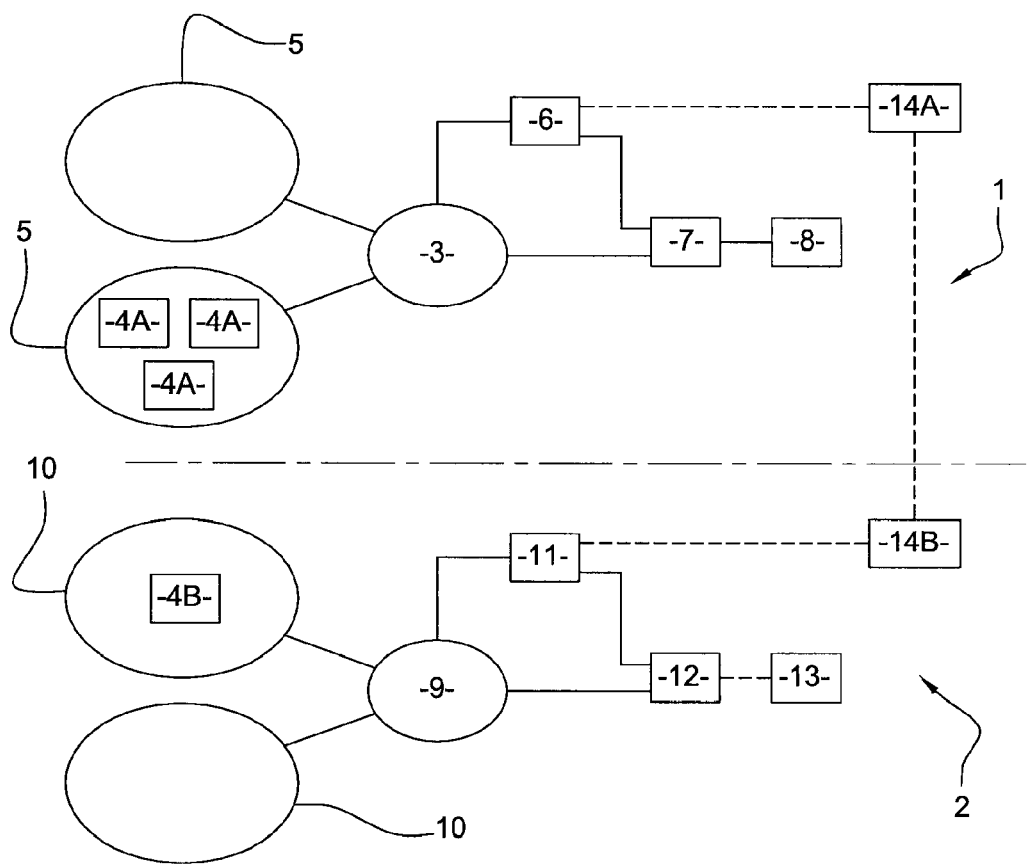
FIG. 1 represents a home type radiocommunication network and a visited type radiocommunication network illustrating a method according to the invention.

For the sake of clarity, only the elements that are essential for an understanding of the invention are represented, the representation being diagrammatic in nature and without reference to scale.

FIG. 1 represents a HOME type radiocommunication network 1 (designated home network 1 in the remainder of this description) and a VISITED type radiocommunication network (designated visited network 2 in the remainder of this description). For purely exemplary purposes, the means described in this embodiment reflect the terminology used in an LTE type technology. It is understood that the infrastructure of these networks is in no way limited to such a radiocommunication standard and may be applied to any type of broadband packet mode radiocommunication standard, for example the WIMAX technology.

Home network 1 particularly comprises a home base station 3 that is able to ensure radio transmission and reception with user terminals 4A that are located in one of the home cells 5 attached to home base station 3; home base station 3 is for example an eNodeB entity in LTE technology.

It should be noted that each user terminal 4A has its own user identification code (identifier), which is called the first user identification code and comprises a network identifier code that is common for multiple networks 1, 2. This network identifier code shared by multiple networks 1, 2 may be formed by a PLMN ID type identifier.

The identifier code shared by multiple networks contained in the user identification code enables the user terminal 4A to be attached to its home network or with another, visited type network that has the same network identifier code. This advantageous effect will be described in greater detail in the following.

The first user identification code also comprises a second user identification code of the home network. This second code may comprise:

an identification codes for a home service area (RniD for Regional Network ID) that may designate a French department, such as the department of Yvelines, for example, an identification code for a category of home users (ORGiD for ORGanisation ID) that may designate the police, and a third user identification within the home service area and the home user category, for example an instance number for the police force in Yvelines.

The association of the identification code for a home service area, the identification code for a home user category, and the third identification code within the home service area and the home user category may be created by an MSIN type identifier. Thus, the first user identification code is an association of the shared network identifier code for multiple networks 1, 2 of the PLMN ID type and of the second home network user identification code of the MSIN type, and form an IMSI type code.

In addition, the second identification code for the home network user may be implemented:

in the form of three unique codes, of which one is dedicated to the service area, a second is dedicated to the service category, and a third is dedicated to the user, or in the form of number ranges, for example a first range from 0 to 1000 is dedicated to the Yvelines fire-fighters, and a second range from 1001 to 2000 is dedicated to the Yvelines police force, or by combining a unique code and a number range.

In addition, home network 1 comprises:

home authentication and control means 6 that are able to authenticate user terminals located in one of the home cells 5 attached to base station 3; home authentication and control means 6 are for example a "Mobility Management Entity" (MME) in LTE technology;

a home distribution gateway 7 that ensure radio reception and transmission with home base station 3; the distribution gateway 7 is for example a "Serving Gateway" (S-GW) in LTE technology;

home means 8 for attachment to a packet network (typically an IP network) such as a "Packet Data Network Gateway" (PDN-GW) in LTE technology; the PDN-GW entity serves as an anchorage point with regard to the "Internet Protocol" (IP) network; it should be noted that it is possible to have several PDN-GWs depending on the type of data to be transmitted;

a home database 14A containing information about the rights of user terminals 4A to access home network 1; home database 14A is for example a "Home Subscriber Server" (HSS).

Visited network 2 comprises:

a visited base station 9 that is able to ensure radio transmission and reception with user terminals 4B located in one of visited cells 10 attached to visited base station 9; visited base station 9 is for example an eNodeB entity in LTE technology; the first user identification code of each user terminal 4B of the visited network comprising the network identifier code shared by multiple networks and a second user identifier code specific to the visited network;

visited authentication and control means 11 that are able to authenticate user terminals located in one of the visited cells 10; the visited authentication and control means 11 are for example a "Mobility Management Entity" (MME) in LTE technology;

a visited distribution gateway 12 that ensure radio reception and transmission with base station 9; visited distribution gateway 12 is for example a "Serving Gateway" (S-GW) in LTE technology;

visited means 13 for attachment to a packet network (typically an IP network) such as a "Packet Data Network Gateway" (PDN-GW) in LTE technology;

a visited database 14B comprising information about the rights of user terminals to access visited network 2; visited database 14B is for example a "Home Subscriber Server" (HSS).

Home network 1 and visited network 2 have the same network identification code, this being the shared network identifier code. The radiocommunication system according to the invention may comprise more than two radiocommunication networks that are identified by the same shared network identifier code for multiple networks.

In one non-limiting embodiment of the invention, the MME home authentication and control means 6 and the MME visited authentication and control means 10 are responsible for authenticating and controlling user terminals 4A and 4B respectively on the basis of information collected in the HSS home database 14A and the HSS visited database 14B.

In general, when a user terminal 4A belonging to a home network 1 and located in one of the home cells 5 requests communication, MME home authentication and control means 6 ensures, through the first user identification code of user terminal 4A, that this terminal indeed has the right of access to home network 1. If it does, user terminal 4A is then allowed to access the services of home network 1. To do this, MME home authentication and control means 6 select the PDN-GW home registration means 8 in order to establish an access channel 15A between home distribution gateway 7 and PDN-GW home attachment means 8. This access channel 15A dedicated to user terminal 4A is for example formed by an S8 type interface. Once the first user identification code has been recognised by home network 1, home network 1 supplies a temporary identification code that enables it to identify the user of user terminal 4A during subsequent attachment to home network 1. Then, when this user terminal 4A belonging to home network 1 and located in home cell 5 requests communication, a step of allocating a data channel 16A to user terminal 4A via access channel 15A is carried out.

As is shown in FIG. 2, when this user terminal 4A moves from home cell 5A to one of the visited cells 10:

either user terminal 4A detects that it is changing network (it is transferring from home network 1 to visited network 2) by means of information systems supplied by visited cell 10 to user terminal 4A, which is now located in visited cell 10. In this case, user terminal 4A separates from home network 1 and proceeds to attach to visited network 2 by providing the visited network its first user identification code;

or user terminal 4A is not able to detect a change of network, in which case it uses its temporary identifier, obtained from home network 1, to attach to visited network 2. Since this temporary identifier, obtained from home network 1, is not managed by visited network 2, visited cell 10 rejects the temporary identifier and forces user terminal 4A to provide its first user identification code, for example of the IMSI type.

During such a change of network, method 100 (shown in FIG. 3) according to invention comprises a first step 101 of accessing visited network 2 by means of the shared network identifier code for multiple networks 1, 2, which user terminal 4A has. This step 101 is only possible if the shared network identifier code for multiple networks 1, 2 that user terminal 4A has is identical with the network identifier code of visited network 2.

If this is the case, a second step 102 for authenticating user terminal 4A is performed. During this second authentication step 102, MME visited authentication and control means 11 use the first identification code of user terminal 4A (IMSI) to determine whether the terminal has access rights to visited network 2. To do this, to MME visited authentication and control means 11 send the first user identification code of user terminal 4A to visited database 14B in known manner. Database 14B proceeds to decode the second user identification code for user terminal 4A in order to determine the identities of home network 1 and home database 14A, which manages the users and rights on home network 1. Communication is established between home database 14A and visited database 14B. These databases will identify the user rights of user terminal 4A via its second user identification code (MSIN) within home network 1 according to a specific decoding method shared by home and visited networks 1 and 2.

If the user of user terminal 4A has access rights to visited network 2, a third step of establishing an access channel 103 is carried out. In this third step 103, MME visited authentication and control means 11 select PDN-GW home attachment means 8 in order to establish an access channel 15B (formed by an S8 type interface compliant with LTE technology) between visited distribution gateway 12 and PDN-GW home attachment means 8 and dedicated to terminal 4A.

In addition, a temporary user identifier for access to visited network 2 is supplied to the user of user terminal 4A during step 103. Thus every time the user of user terminal 4A submits a communication request in visited network 2, he will be authenticated by means of its temporary access identifier for visited network 2 and will be routed directly to the means for attachment to a packet network in its own network 1. This method is identical with the standard establishment of a data channel on the basis of a temporary user identifier (known more commonly by the acronym T-IMSI in LTE technology).

Then, when this user terminal 4A belonging to a home network 1 and located in one a visited cell 10 requests communication, a fourth step 104 of allocating a data channel 16B to user terminal 4A via access channel 15B is carried out. The procedure for establishing data channels conforms to the 3GPP standard.

As was indicated earlier, the identification code for a home service area may represent a French department such as the department of Yvelines, whereas the identification code for a category of home users may represent the police. In this example, the user's home network is represented by the network of the Yvelines police force.

In this context, if a user whose home network is the Yvelines police force is located in a cell of the police network for the Hauts-de-Seine department, an access channel will be set up between the distribution gateway of the network for the Hauts-de-Seine police force and the means for attachment to the packet network of the Yvelines police force network. In this configuration, roaming is purely geographic. It should be noted that the user's rights and billing are linked to the roaming agreements that exist between the home network and the visited network.

According to another embodiment of the method according to the invention, not shown, a user whose home network is the Yvelines police force network may wish to use the network of the Yvelines fire-fighters. In this case, an access channel will be set up between the distribution gateway of the fire-fighters network and the means for attachment to the packet network of the police force network in the same geographical area, that is to say Yvelines. In this configuration, roaming is purely organisational. It should be noted that the user's rights and billing are linked to the roaming agreements that exist between the home network and the visited network.

Of course, the roaming method may be both organisational and geographical at the same time. By way of example, a member of the Yvelines police force may wish to use the network serving the Hauts-de-Seine fire service. In this case, an access channel will be set up between the distribution gateway of the fire-fighters network in Hauts-de-Seine and the means for attachment to the packet network of the police force in Yvelines.

Furthermore, the method according to the invention has been described more particularly with an HSS home database 14A and an HSS visited database 14B, which communicate not only with one another but also with MME home authentication and control means 6 as well as with MME visited authentication and control means 10. Of course, within the scope of the invention a single centralised database formed by database 14A or 14B may be used. In this case, the centralised database comprises information about the rights of user terminals 4A and 4B to access both home network 1 and visited network 2. This centralised database also communicates with MME home authentication and control means 6 and MME visited authentication and control means 10.

According to an embodiment of the method according to the invention that is not shown, decoding of the second user identification code within the home network (MSIN) may be carried out:

either at visited base station 9 to direct the request for attachment to the visited network to specific MME visited authentication and control means in the visited network 2;

or at the MME visited authentication and control means by choosing an HSS visited database 14B that is able to decode the second user identification code of the home network (MSIN).

It should be noted that the technology of home network 1 may differ from that of visited network 2.

Thus, home network 1 may conform to a technology of type LTE, Wimax or 3G, whereas visited network 2 may conform to a technology of type LTE, Wimax or 2G. When the home network conforms to a Wimax type technology, the database is formed by an "Authentication, Authorization and Accounting" (AAA) entity.

The invention described also relates to a method and system of radiocommunication for attachment and authentication of a user terminal with a visited network. According to one embodiment, the steps of the method of the invention are determined by the instructions of a computer program incorporated in a radiocommunication system entity. The program is able of operating in the radiocommunication system according to the invention and comprises software instructions which carry out the steps of the method according to the invention when the program is run in an entity of the radiocommunication system, the entity then being controlled by the execution of the program.

Accordingly, the invention also applies to a computer program, in particular to a computer program recorded on or in a computer-readable storage medium and any data processing device that is configured to implement the invention. This program may use any programming language, and may be in the from of source code, object code or intermediate code between source and object code, or it may be in a partially compiled form, or in any other form that may be desired for implementing the method according to the invention. The program may be downloaded into the base station via a communication network such as the internet.

The recording medium may be any entity or device that is capable of storing the computer program. For example the carrier may comprise a storage means on which the computer program according to the invention is recorded, such as a ROM, for example a CD ROM or a ROM of a microelectronic circuit, or even a USB memory stick, or some other means of magnetic recording, for example a floppy disk or hard disk.

The invention may be applied in all types of radiocommunication networks and is applied in a particularly interesting manner in professional radiocommunication networks of the PMR type.

The invention claimed is:

1. A method for attachment and authentication of a user terminal of a home type radiocommunication network with a visited type radiocommunication network that is separate from said home type radiocommunication network, the home network comprising home means for attachment to a packet network and the visited network comprising:

at least one visited base station configured to ensure radio transmission and reception with user terminals located in at least one visited cell attached to the visited base station;

visited authentication and control means of user terminals configured to authenticate the user terminals attached to the visited network; and at least one visited distribution gateway ensuring radio reception and transmission with the at least one visited base station;

wherein, the home network and the visited network each have a same network identifier code that is shared by said at least home network and visited network, wherein each user terminal belonging to the home network has a first user identification code comprising the same network identifier code shared by at least the home network and the visited network, and a second home network user identification code, wherein when the user terminal belonging to the home network is located in a visited cell of the visited base station the method comprises:

establishing an access channel between the visited network and the user terminal of the home network via the shared same network identifier code;

authenticating the user terminal in the visited network, via the second user identification code of the home network with at least one database comprising information relating to the user access rights of the user terminals for the visited network; and if the user terminal possesses an access right to said visited network, establishing an access channel dedicated to the user terminal of the home network between the visited distribution gateway and the home attachment means of said home network so that, when said access channel dedicated to the user terminal of the home network is established, said user terminal subscribed to said home type radiocommunication network communicates with said home type radiocommunication network when said user terminal is located in said visited type radiocommunication network, wherein the second home network user identification code comprises:

an identification code for a service area of the home network;

an identification code for a category of users of the home network; and a third user identification code within the service area of the home network and the home network user category, and wherein the authentication of the user terminal of the home network in the visited network is performed using at least one of the three identification codes of the second user identification code of the home network.

2. The method as recited in claim 1, wherein authentication of the home network user terminal takes place in the visited network and comprises a decoding of the second identification code of the home network user terminal in the visited base station that directs a request for attachment submitted by the user terminal to the visited network towards the visited authentication and control means that communicate with the at least one database.

3. The method as recited in claim 1, wherein authentication of the home network user terminal is carried out by means of the visited authentication and control means that communicate with the at least one database.

4. The method as recited in claim 1, wherein the database is a centralised database that communicates with the home network and the visited network.

5. The method as recited in claim 1, wherein the database is a visited database belonging to the visited network and a home database belongs to the home network the home database communicating with the visited database to authenticate the user terminal of the home network.

6. The method as recited in claim 1, wherein the access channel dedicated to the user terminal of the home network between the visited distribution gateway and the home attachment means is an S8 interface conforming to a behaviour described in an LTE mobile radiocommunication standard.

7. The method as recited in claim 1, wherein the visited network is compliant with an LTE mobile radiocommunication standard, the visited attachment means being formed by a Packet Data Network Gateway (PDN-GW) entity, the visited authentication and control means being formed by a Mobility Management Entity (MME), the visited distribution gateway being formed by a Serving Gateway (S-GW), the at least one visited base station being formed by an evolved NodeB entity, the visited database being formed by a Home Subscriber Server (HSS).

8. The method as recited in claim 1, comprising allocating a data channel passing through the access channel dedicated to the user terminal of the home network between the visited distribution gateway and the home attachment means once the user terminal of the home network attached to the visited network requests communication.

9. The method as recited in claim 1, wherein the same network identifier code shared by the home network and the visited network conforms to a PLMN ID type syntax.

10. The method as recited in claim 1, wherein the technology of the home network differs from that of the visited network.

11. A radiocommunication system comprising at least one radiocommunication network of a home type and one radiocommunication network of a visited type that is separate from said home type radiocommunication network, the home network comprising at least one user terminal and a home packet data network gateway, and the visited network comprising:

at least one visited base station configured to ensure radio transmission and reception with user terminals located in at least one visited cell attached to the visited base station;

a visited mobility management entity that is configured to authenticate user terminals attached to the network; and at least one visited distribution gateway configured to ensure radio reception and transmission with at least one visited base station;

wherein, the home network and the visited network each have a same network identifier code that is shared by said at least home network and visited network, wherein each user terminal belonging to the home network has a first user identification code comprising the same network identifier code shared by at least the home network and the visited network, and a second home network user identification code, and wherein when the user terminal belonging to the home network is located in a visited cell of the visited base station the system is configured to establish an access channel between the visited network and the user terminal of the home network via the shared same network identifier code;

authenticate the user terminal in the visited network via the second user identification code of the home network with at least one database comprising information relating to the user access rights of the user terminals for the visited network; and if the user terminal possesses an access right to said visited network, establish an access channel dedicated to the user terminal of the home network between the visited distribution gateway and the home attachment means of said home network so that, when said access channel dedicated to the user terminal of the home network is established, said user terminal subscribed to said home type radiocommunication network communicates with said home type radiocommunication network when said user terminal is located in said visited type radiocommunication network, wherein the second home network user identification code comprises:

an identification code for a service area of the home network;

an identification code for a category of users of the home network; and a third user identification code within the service area of the home network and the home network user category, and wherein the authentication of the user terminal of the home network in the visited network is performed using at least one of the three identification codes of the second user identification code of the home network.

12. A non-transitory machine readable medium comprising one or more sequences of instructions that are executable by an information processing unit, the execution of the instruction sequences enabling to carry out the method according to claim 1.

* * * * *